UNITED STATES PATENT OFFICE.

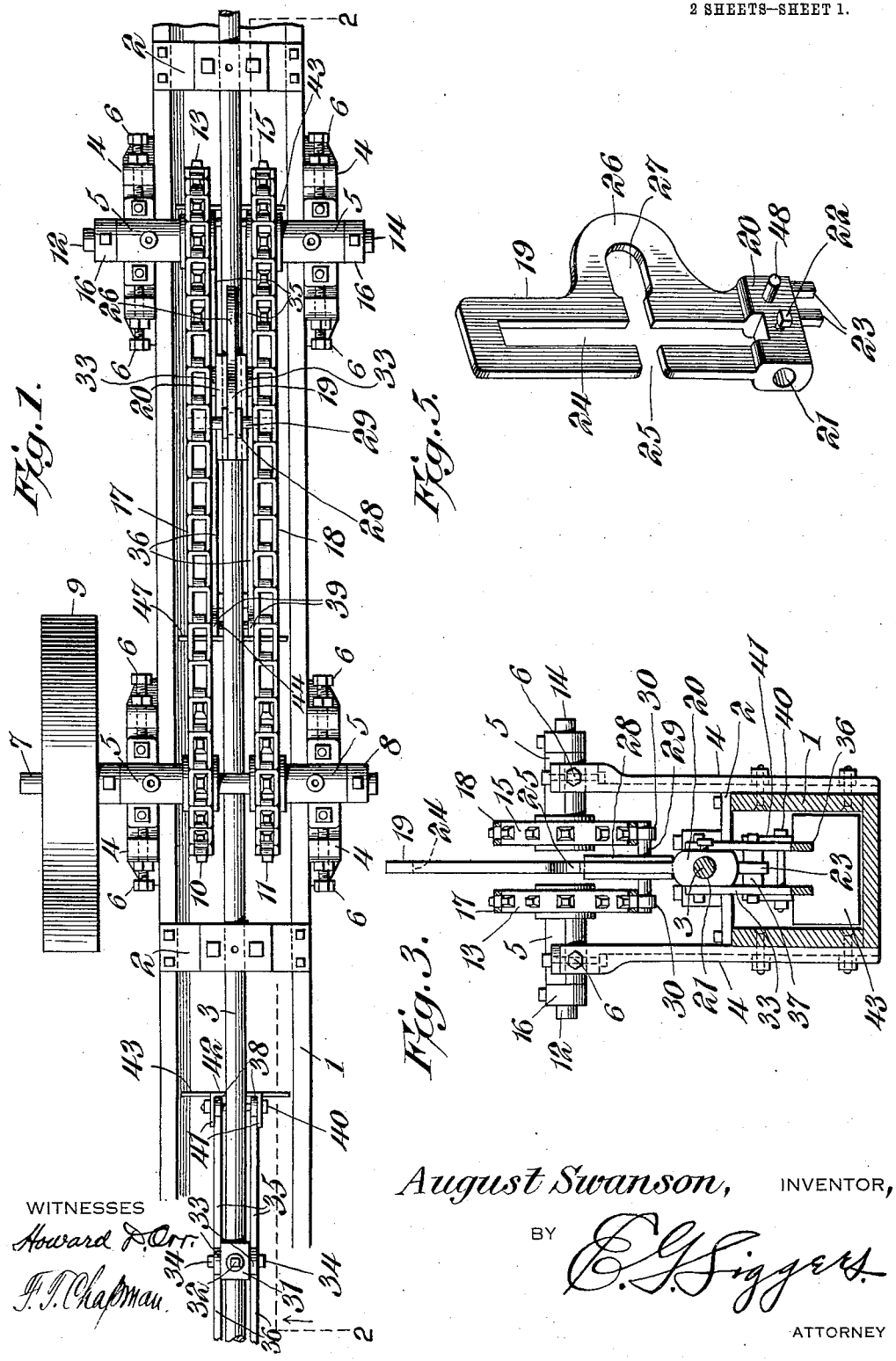

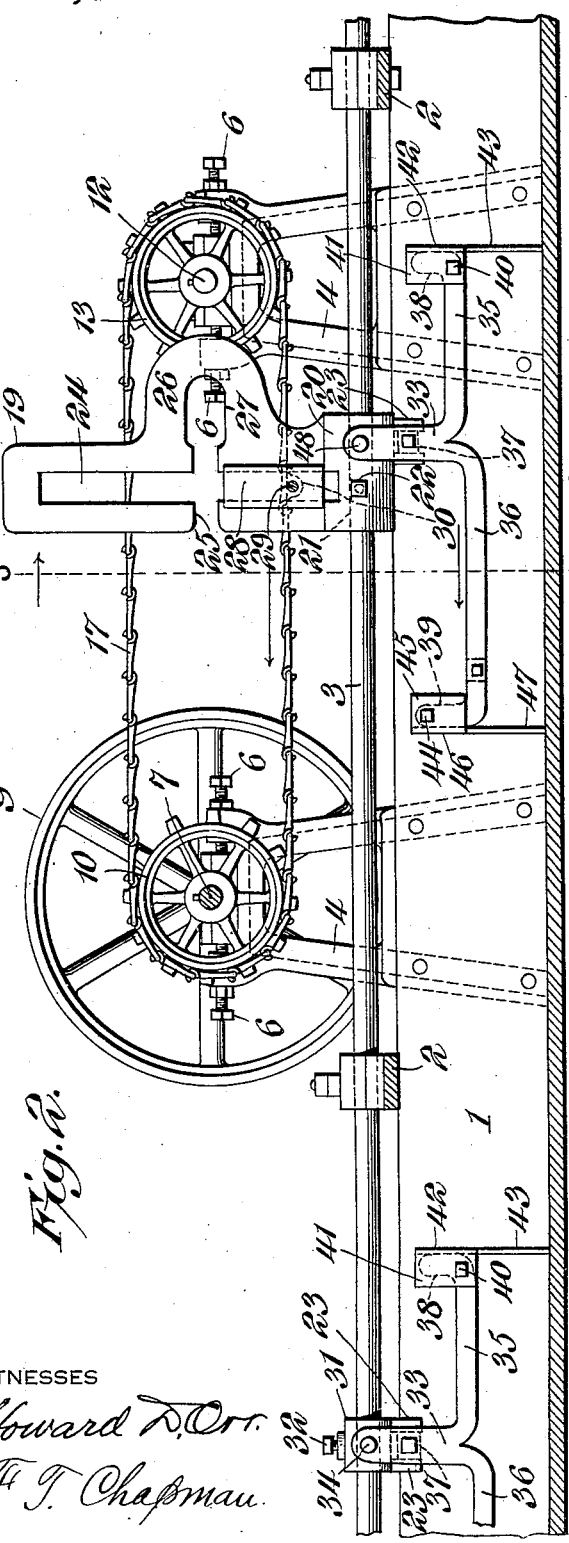

AUGUST SWANSON, OF CEDAR RAPIDS, IOWA.

CONVEYER.

1,065,746.  Specification of Letters Patent.  Patented June 24, 1913.

Application filed July 23, 1912.  Serial No. 711,137.

*To all whom it may concern:*

Be it known that I, AUGUST SWANSON, a citizen of the United States, residing at Cedar Rapids, in the county of Linn and State of Iowa, have invented a new and useful Conveyer, of which the following is a specification.

This invention has reference to improvements in conveyers, and its object is to provide a conveyer which may be used under conditions ordinarily destructive to parts of the conveyer, the present invention contemplating the use of readily replaceable parts where severely subjected to chemical or other actions destructive in their nature, and at the same time producing a conveyer which will thoroughly propel the material being acted upon.

The conveyer of the present invention is particularly useful in starch factories where considerable acid is oftentimes present in the conveyer box, and in the case of a screw conveyer or device of like character, the acid will attack the metal and soon destroy it, thus making the cost of repairs high. In the present invention the only parts which come into contact with the material to be conveyed are in the from of sheet metal blades which may be readily and cheaply replaced, while the construction of the conveyer is such that the material is efficiently moved without liability of contaminating surrounding parts. The actuating means for the conveyer may be placed at any convenient point along the conveyer and the stroke of the conveyer may be adjusted conveniently if such be desired.

The invention will be best understood from a consideration of the following detailed description taken in connection with the accompanying drawings forming a part of this specification, with the further understanding that while the drawings illustrate a form of the invention which has given good service in practice, the invention is by no means confined to any exact conformity with the showing of the drawings, since the invention is susceptible of various changes and modifications which mark no material departure from the salient features of the invention.

In the drawings:—Figure 1 is a plan view of a portion of the conveyer showing the actuating mechanism. Fig. 2 is a section on the line 2—2 of Fig. 1 with some parts shown in elevation. Fig. 3 is a section on the line 3—3 of Fig. 2 with some parts omitted. Fig. 4 is a perspective view of one of the conveyer elements and a portion of the actuating rod upon which it is mounted. Fig. 5 is a perspective view of a clearance actuating member through which a continuously traveling device imparts a reciprocatory motion to the conveyer elements.

Referring to the drawings, there is shown a trough 1, which may be made of suitable material, and is usually rectangular in cross section, although the particular shape of this trough is not material. The length of the trough will vary in accordance with the distance to which the material is to be conveyed.

The upper side of the conveyer trough is shown as open, and at suitable points bearing blocks 2 are secured to the upper edges of the sides of the trough in traversing relation to the open top of the trough. Mounted in the bearings 2 is a rod 3 which may be substantially as long as the conveyer trough and extends centrally thereof at a point which may be somewhat higher than the upper edges of the trough. Secured to the side walls of the trough at any appropriate points are uprights 4, each extending to a higher point than the blocks 2 and at their upper ends carrying bearings 5 capable of adjustment lengthwise of the trough by means of set screws 6.

The bearings 5 of one set of uprights 4 receive and sustain a shaft 7 which may be considered as the power shaft of the conveyer, and this shaft extends entirely across the trough at a suitable distance above the same and may be held against longitudinal movement by suitable set collars 8, while one end of the shaft extends appropriately beyond the corresponding bearing and set collar and there receives a pulley 9, by means of which power may be applied to the shaft through a suitable belt. The pulley 8 may be taken as indicative of any means of rotating the shaft, and as not confining the power means necessarily to a belt and pulley.

Mounted on the shaft 7 between the bearings 5 are two sprocket wheels 10, 11, respectively, these sprocket wheels being spaced one from the other about equi-distantly from the vertical plane of the longitudinal axis of the rod 3, the conveyer being considered as installed. At an appropriate distance from the uprights 4 sustaining the shaft 7 are other uprights 4 in all respects like the first-named uprights, and each carrying a bearing 5 similar to the bearings 5 before mentioned. One bearing 5 carries a short shaft 12 having fast thereto at the inner end of the bearing a sprocket wheel 13 in line with the sprocket wheel 10, while the other bearing 5 carries a shaft 14 having at its inner end a sprocket wheel 15 in line with the sprocket wheel 11. The adjacent inner ends of the shafts 12 and 14 are spaced apart a distance equal to the spacing of the sprocket wheels 10 and 11, and the sprocket wheels 13 and 15 are similarly spaced apart without any shaft connection between them. Applied to the outer ends of the shafts 12 and 14 are set collars 16, which in conjunction with the respective sprocket wheels 13 and 15 hold the shafts against longitudinal movement in their bearings.

The sprocket wheels 10 and 13 are connected by an endless sprocket chain 17 and the sprocket wheels 11 and 15 are connected by an endless sprocket chain 18, these sprocket chains being spaced apart as are the sprocket wheels and travel at like speeds, since they are both driven by the sprocket wheels mounted on the single shaft 7.

Mounted to slide on the upper edges of the side members of the trough is a frame 19 of flat form rising from a laterally expanded base portion 20 through which there is formed a passage 21 for the rod 3, to which the base portion is secured by a set screw 22. Formed on the base portion are spaced lugs 23 for a purpose which will presently appear. The frame 19 is upright and rises from the rod 3 between the chains 17 and 18 about midway of the distance between these chains, and is formed with an upright slot 24 extending from the base 20 to near the upper end of the frame and with a transverse slot 25 intersecting the first-named slot and opening through one edge of the frame 19, while the other edge of the frame is formed with an offset 26 containing a continuation 27 of the slot 25, which continuation may be widened in the direction of the height of the frame.

Fitted to the slot 24 is a block 28 elongated in the direction of the length of the slot 24 and shaped to embrace the side faces of the frame 19 adjacent the slot. This block is connected by a pin 29 extending transversely through the block to corresponding links of the sprocket chains 17 and 18, which links may be formed with eyes 30 for the reception of the pin 29.

Suppose that power is applied to the shaft 7 to cause it to rotate clockwise as viewed in Fig. 2, then the lower run of the sprocket chain will move from right to left, as indicated by the arrow in Fig. 2. Since the block 28 is fast to the frame 19 in a manner that it cannot escape therefrom, although capable of moving lengthwise of the slot 24, the frame 19 and with it the rod 3 made fast to the frame by the set screws 22 will also move from right to left as viewed in Fig. 2. This movement continues until ultimately the shaft 7 is reached, but this shaft does not interfere with further movement of the frame 19, since the slot 25 is so positioned that the shaft will enter the open end of the slot and pass the slot 24 into the enlarged portion 27 of the slot. As soon as the shaft 7 has come into line with the slot 24 and is about to pass to the extension 27 of the slot 25 the portions of the chains 17 and 18 attached to the block 28 begin to pass upwardly about the then forward edge with the sprocket wheels 10 and 11 so that the block 28 is forced to move upwardly along the slot 24, the frame 19 continuing the forward movement until the block 28 has reached the greatest extent of travel of the chains toward the left, and then the block continues upwardly along the slot 24 toward the upper end thereof as the portions of the chains to which the block is attached move toward the upper runs, which in turn travel toward the right as viewed in Fig. 2, so that the frame 19 then is moved toward the right or in the reverse direction to that first described. When the extension 26 reaches the sprocket wheels 13 and 15, it simply passes between the spaced ends of the shafts 12 and 14 without interference and the block 28 is caused to move downward in the slot 24 as the lower runs of the chains are reached. When the frame 19 started on this movement toward the right, the block 28 had already passed above the horizontal slot 25 out of the path of the shaft 7, so that the escape of this shaft from the slot 25 was not impeded.

The continuous movement of the chains 17 and 18 about the respective sprocket wheels causes a reciprocatory movement to be imparted to the frame 19 and by the latter to the rod 3, this reciprocatory movement being in extent equal to the spacing of the sprocket wheels with respect to those portions of the sprocket wheels most distant one from the other, or greater by the diameter of one sprocket wheel than the distance between the shaft 7 and the shafts 12 and 14. If a greater or lesser extent of travel of the rod 3 is desired, the uprights 4 carrying the main shaft 7 or the sub-shafts 12 and 14 may be adjusted lengthwise of the trough in the proper direction and the chains lengthened or shortened accordingly by the addition or removal of links.

The rod 3 carries an appropriate number of blocks 31 adjustable along the rod and held in adjusted positions by set screws 32. Straddling each block 31 is a pair of arms 33 pivoted to the block by trunnions 34 carried by the block and these arms have integral extensions 35, 36 projecting in opposite directions lengthwise of the trough. The arms are held apart by spacers 37 and the extensions each terminate in upturned ends 38, 39, respectively. The point where the uprights 38 of the extensions 35 join them are traversed by a pivot bolt 40 extending through side wings 41 of an extension 42 of a blade 43. The extremities of the angle portions 39 of the extensions 36 are traversed by a pivot bolt 44 passed through side wings 45 of an extension 46 of a blade 47. By this means the blade 43 is pivoted to the extensions 35 close to the body of the blade, while the blade 47 is pivoted to the angle portions 39 at a point remote from the body of the blade and both blades are mounted outside the terminal portions of the respective extensions 35 and 36. By this means both blades will trail when the rod 3 is moved in one direction. When, however, the rod is moved in the other direction, both blades are stopped when at approximately right angles to the length of the extensions 35 and 36 by engagement with the respective angle portions 38 and 39. The body portion 20 of the frame 19 may also be provided with trunnions 48 supporting arms 33 carrying a pair of blades 43 and 47 the same as the blocks 31 and in such case the spreader 37 between the arms 33 is lodged between the lugs 23 on the frame base 20 so that excessive rocking of the carrier for the blades is prevented. While in the drawings but two pairs of blades 43, 47 are shown, it will be understood that as many pairs of blades as are desired may be employed. The blades are so located as to rest within the trough 1 and may be of a height and breadth to substantially agree to the cross-sectional area of the portion of the trough in which they are located, with the bottoms of the blades when in their active position engaging the bottom of the trough. The blade carriers are adjusted apart such a distance that a blade of one carrier will overlap the travel of the adjacent blade of the next carrier, so as to engage and carry forward material propelled by the other blade, all the blades in one direction of travel trailing and becoming active in the other direction of travel.

Should the acid employed when the device is used as a conveyer in a starch mill or under like conditions, attack the blades to an extent to become destructive thereto, the damaged blades are readily replaced by new ones by the simple removal of the bolts 40 or 44, as the case may be, when the device is again ready for operation as though no damage had been done. The blades 43 and 47 may be readily stamped out of sheet metal at slight cost, while the rest of the device is not liable to damage and will withstand long use without repairs.

It has been found in practice that the conveyer of the present invention requires materially less power for its actuation than a screw conveyer, and will consequently perform much more work with the same power, while such repairs as become necessary from time to time because of the character of the material being treated are much more readily and cheaply made than is the case with a screw conveyer or other bulky type of conveyer, and, moreover, the whole device is sufficiently flexible so far as adjustments are concerned to adapt it to varying conditions, since the extent of travel of the conveyer for each reciprocation is readily changeable without modification of the construction, further than resetting of the bearing uprights and elongating or shortening the sprocket chains. By mounting the rod 3 intermediate of the sides of the conveyer and providing spaced chains both acting simultaneously to drive the rod, all side strains are avoided and the amount of power necessary to drive the mechanism is correspondingly reduced.

What is claimed is:—

1. In a conveyer, a conveyer trough, a reciprocatory rod extending lengthwise thereof, and spaced pairs of adjacent blades, each pair of blades having a common mounting in turn carried by and movable with the rod, the blades of each pair being mounted for trailing in one direction and actively operating in the other direction.

2. In a conveyer, a trough, a rod mounted thereon for longitudinal reciprocation, and conveyer elements carried by the rod and each comprising oppositely directed members extending lengthwise of the conveyer trough, and a readily removable pivoted blade carried by the outer end of each member in position to trail when the member is moved in one direction and become active when the member is moved in the other direction.

3. In a conveyer, provided with longitudinal reciprocatory rod, a conveyer element mounted on said rod for adjustment therealong and provided with oppositely directed extensions longitudinal of the rod, each extension having at the outer end a pivoted blade movable to trailing position when the element travels in one direction and into active position when the element travels in the other direction.

4. In a conveyer, a conveyer trough, a reciprocatory rod extending lengthwise thereof, a block carried by the rod and adjustable longitudinally thereof, spaced arms pivotally connected to the block and provided with oppositely directed portions extending lengthwise of the conveyer trough, each of said portions terminating in upturned ends, and a conveyer blade carried by the outer end of each extended portion of the arms, one blade being pivotally connected at substantially the outer ends of the upturned extensions and the other blade being pivotally connected at substantially the junction of the upturned ends with the corresponding longitudinally extended portions of the arms.

5. In a conveyer, a conveyer trough, a reciprocatory member movable lengthwise of the conveyer trough, associated pairs of conveyer blades adapted to the trough, a carrier common to each pair of conveyer blades and on which the latter are mounted for trailing in one direction of reciprocation, and supports between the carrier and reciprocating member, the distance between the carriers being related to the extent of travel of the reciprocating member to cause the forward blade of a pair of blades on its forward movement to overlap the rear limit of movement of the rear blade of the next preceding pair.

6. In a conveyer, a conveyer trough, reciprocatory blades therein for impelling material therethrough and means for reciprocating said blades, each blade consisting of a plate with an end extension having side wings providing means for the pivotal support of the plate.

In testimony, that I claim the foregoing as my own, I have hereto affixed my signature in the presence of two witnesses.

AUGUST SWANSON.

Witnesses:
HUGH H. GOFF,
W. C. STARING.

Copies of this patent may be obtained for five cents each, by addressing the "Commissioner of Patents, Washington, D. C."